United States Patent [19]
Abe et al.

[11] Patent Number: 5,756,265
[45] Date of Patent: May 26, 1998

US005756265A

[54] MULTILAYER OPTICAL DISC AND METHOD OF MAKING SAME

[75] Inventors: Shinya Abe; Toshinori Kishi, both of Osaka, Japan

[73] Assignee: Matsushita Electric Industrial Co., Ltd., Kadoma, Japan

[21] Appl. No.: 659,449

[22] Filed: Jun. 6, 1996

[30] Foreign Application Priority Data

Jun. 9, 1995 [JP] Japan ................................. 7-143248

[51] Int. Cl.$^6$ ................................. G11B 7/24; G11B 7/26
[52] U.S. Cl. ................ 430/321; 430/945; 369/275.4; 369/284
[58] Field of Search ........................ 430/321, 945; 369/275.4

[56] References Cited

U.S. PATENT DOCUMENTS 4,450,553   5/1984   Holster ................................. 369/275.5

FOREIGN PATENT DOCUMENTS 63-263644   10/1988   Japan .

*Primary Examiner*—John A. McPherson
*Attorney, Agent, or Firm*—Wenderoth, Lind & Ponack

[57] ABSTRACT

A method of making a multilayer optical disc of a type formed by laminating a plurality of signal layers each having a spiral or concentric pattern of a series of pits so that information can be read by irradiating any one of the signal layers with a playback laser from a surface of a substrate of the optical disc and reading waveforms reproduced therefrom. A master disc having a pit pattern formed thereon by exposing to a modulated exposure light pulse train is prepared for each of signal recorded layers. Based on this master disc, a mold is then prepared having a pit pattern which is a replica of the pit pattern on the master disc. Using the molds, respective replicas are formed and bonded together in face-to-face relation to thereby provide the multilayer optical disc. The series of pits on each signal layers in the master disc has a pit width or a pit length so chosen as to permit a signal reproduced from each signal layer to represent a waveform substantially identical with that of a signal which has been recorded.

10 Claims, 10 Drawing Sheets

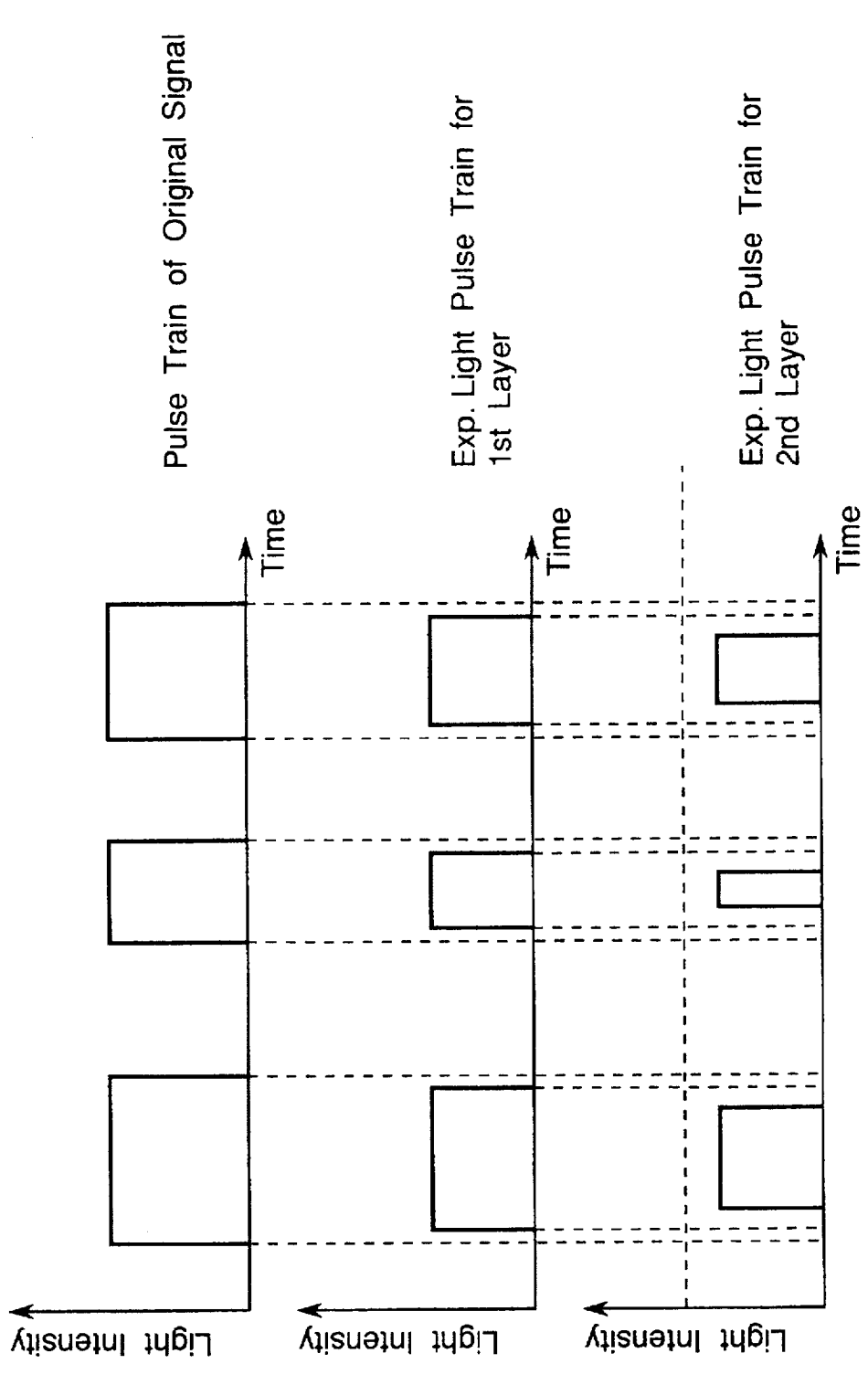

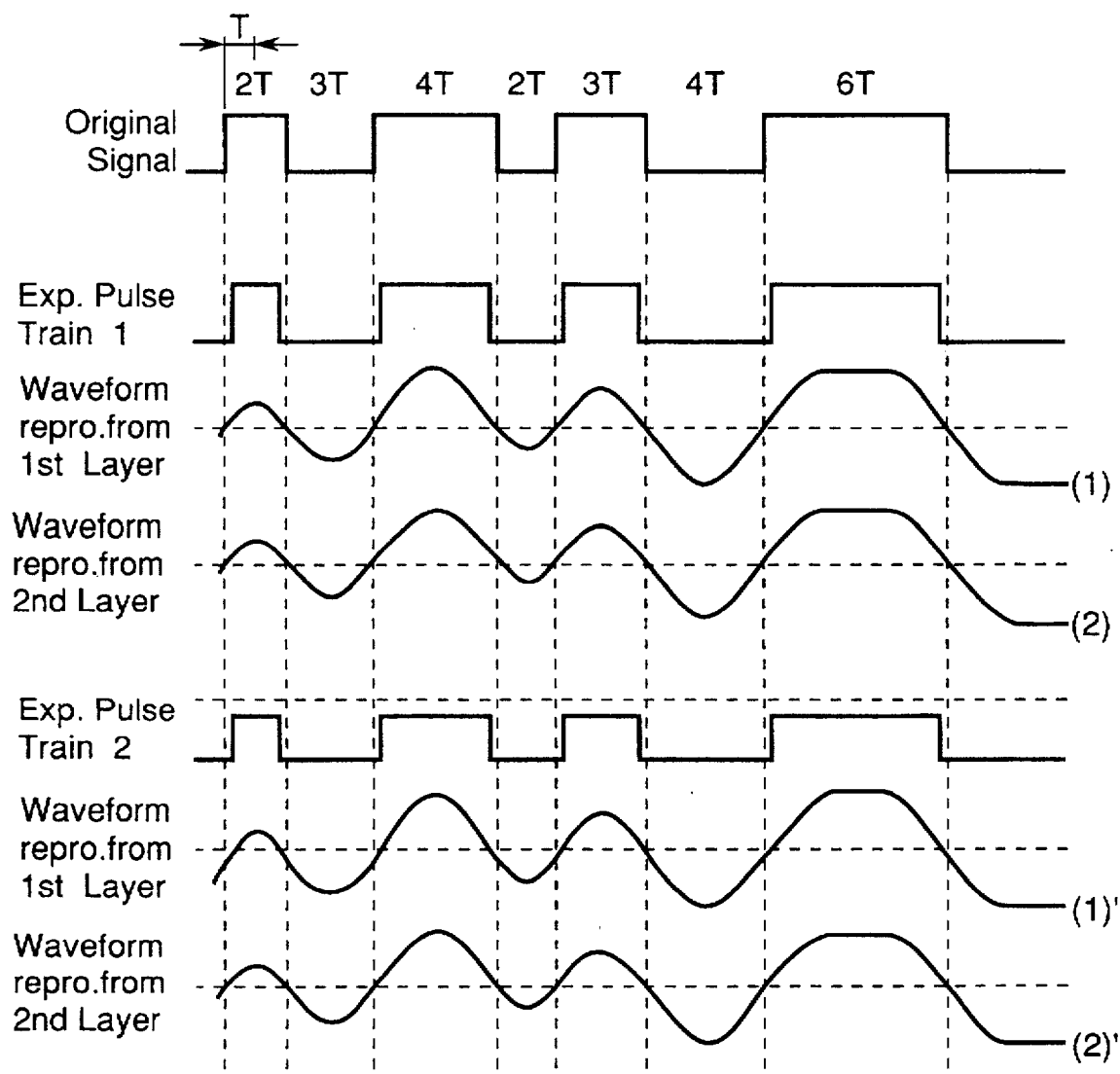

MULTILAYER OPTICAL DISC AND METHOD OF MAKING SAME

BACKGROUND OF THE INVENTION 1. (Field of the Invention)

The present invention generally relates to a multilayer optical disc of a single-side reading type, i.e., a type in which information recorded in the optical disc can be read from one side thereof. More particularly, the present invention relates to the multilayer optical disc exclusively dedicated for information playback purpose. The present invention also relates to a method of making the multilayer optical disc of the single-side reading type.

2. (Description of the Prior Art)

By the time compact discs (CDs) came to be marketed about fifteen years ago phonograph records had been a mainstream medium with which users could purchase music software. Because of the compactness and ease of handling, compact discs have quickly taken the place of the phonograph records. In the field of information handling systems, compact discs have received widespread attention because of their high information storage capacity. Compact discs used in the field of information handling systems are nowadays marketed in the form of a CD-ROM, although compact discs of a type on and from which information can be recorded and reproduced one at a time are also available in the market.

For use as a CD-ROM, an optical disc is generally employed in which information is recorded in the form of a spiral row of pits. However, with the advent of the age of information, the need is growing for a high-density optical disc. In order to provide the high-density optical disc, attempts have been made to reduce the physical size of each pit to thereby increase the physical density and to provide the single optical disc with a plurality of information recording layers. The optical disc having the plural information recording layers is available in two types depending on the information reading system; the type (single-side reading type) in which information recorded in the optical disc can be read from one side thereof, and the type (double-side reading type) in which information recorded in the optical disc can be read from opposite sides. The U.S. Pat. No. 4,450,553, issued May 22, 1984, disclose both of those types.

Reading of information from the multilayer optical disc is basically carried out by passing a playback laser beam through the substrate so as to be focused on the signal recording layer, detecting rays of light reflected from the signal recording layer which have been modulated under the influence of recesses and protrusions on the signal recording layer or the reflectivity and change in wavefront, and demodulating the signal to restore the information recorded on, the information recording layer. Also, in order for signals recorded on each of the signal recording layer to be accurately reproduced, a layer separating the neighboring signal recording layers from each other must have a sufficient thickness to isolate respective signals read out from the associated signal recording layers and, for this reason, where the signals are to be reproduced from each signal recording layer, it is comparable to reproduction of information from an optical disc of a thickness corresponding to the sum of the thickness of the substrate upon which the incoming playback beam is incident and the thickness of the layers between the neighboring signal recording layers.

However, the playback optical system is so designed as to optimally collect light only with respect to a predetermined thickness of the disc and the depth of focus is narrowed due to the use of a high numerical aperture of an objective lens in a playback device or the use of a short wavelength for a playback laser beam in an attempt to reproduce information from a high density disc. For this reason, the size of a spot of the playback beam varies depending on the cumulative thickness of the signal recorded layers. On the other hand, the reproduced waveform is affected by the size of the light collecting spot of the playback optical system and the size of the pits or marking on the disc formed. Because of this, if the pits or makings in the signal recorded layers are formed equally, the relationship between the size of the spot of the playback beam and the size of the pits or markings varies for each of the signal recorded layers, accompanied by change in reproduced waveform and, accordingly, signals recorded in all of the signal recorded layers cannot be reproduced satisfactorily.

With the single-side reading system, depending on the structure of the signal recorded layers and the manufacturing method, it may occur that recesses and projections forming the pits may be reversed. In particular, in the method of making the single-side optical disc in which replicas having the signal recorded layers consisting of pit trains are formed, followed by formation of a semitransparent film and a reflective film over the respective signal recorded layers before those replicas are bonded together with the signal recorded layers confronting with each other, depending on how they are formed, the size of the pits may fluctuate. Accordingly, as is the case discussed above, the reproduced waveforms of each signal recorded layer vary and the signal recorded on all of the layers cannot be reproduced satisfactorily.

SUMMARY OF THE INVENTION

Accordingly, the present invention is intended to provide a multilayer optical disc, and a method of making the same, of a type capable of providing substantially the same reproduced waveforms for substantially the same recorded signals.

In other words, the present invention is intended to provide a multilayer optical disc, and a method of making the same, of a type wherein in order to obtain the substantially same reproduced waveforms for the substantially same recorded signal, pits are properly shaped in consideration of reproducing characteristics of a signal recorded surface relative to a playback laser beam.

In order to form the pits of a proper width and length on each signal recorded layer, conditions for formation of the pits on a master disc for each signal recorded layers must be tailored In view of this, the present invention provides a method of making a multilayer optical disc of a type formed by laminating a plurality of signal layers each having a spiral or concentric pattern of a series of pits so that information can be read by exposing any one of the signal layers with a playback light reflected from a surface of a substrate of the optical disc and reading waveforms reproduced therefrom. The method includes the steps of preparing a master disc for each of the signal layers. The master disc has a pit pattern formed thereon by exposing to an exposure light pulse train which is modulated according to a signal to be recorded. Molds are prepared one for each of the signal layers with the use of the master disc. The mold has a pit pattern which is a replica of the pit pattern on the master disc. Replicas of the respective molds are prepared and then bonded in face-to-face fashion together to provide an optical disc having the plurality of the signal layers. The series of pits on each signal layers in the master disc has a pit width or a pit length chosen so as to permit a signal reproduced from each signal layer to represent a waveform substantially identical with that of a signal which has been recorded.

In the practice of the present invention, the master disc is generally prepared by spirally exposing a glass disc coated with a photosensitive material with a recording beam modulated according to a signal to be recorded and subsequently developing the glass disc to form a train of pits. The width and length of the pits formed on the master disc varies depending on the intensity of the recording beam, the length of the modulated pulses, the composition of the photosensitive material and the sensitivity of the process as a whole to light including conditions used to develop the photosensitive material on the glass disc. Of them, the intensity of the light to which the glass substrate is exposed and the length of the light pulses can relatively easily be changed and may bring considerable effects.

In other words, the higher the intensity of the recording beam to be exposed, the greater the size of the pits formed. Conversely, the lower the intensity of the recording beam, the smaller the pits formed. Also, the greater the length of the light pulses, the greater the pits formed and, conversely, the smaller the length of the light pulses, the smaller the pits formed.

Thus, by varying those conditions, the size, that is, the width and the length, of the pits formed on each of the signal recorded layers can be adjusted to provide the master disc with an optimum pit size for each of the signal recorded layers.

Preferably, during the preparation of the master disc for each of the signal layers, a starting or terminating end of each pulse of the light pulse train modulated according to a signal representative of information to be recorded may be advanced or delayed during exposure to the light pulse train in consideration of a change in reproduced waveform of any one of the signal layers relative to the light pulse train to thereby change the pit width or pit length so as to permit a signal reproduced from each signal layer to represent a waveform substantially identical with that of a signal which has been recorded.

In particular, during the preparation of the master disc for each of the signal layers by advancing or delaying the starting or terminating end of each pulse of the light pulse train modulated according to the signal to be recorded to thereby change the pit width or pit length, it is preferred that the master disc is prepared by advancing or retarding the starting or terminating end by an equal quantity.

Also preferably, during the preparation of the master disc for each of the signal layers, the intensity of each light pulse of the light pulse train may be varied during exposure to the light pulse train in consideration of a change in reproduced waveform of any one of the signal layers relative to the light pulse train to thereby change the pit width or pit length so as to permit a signal reproduced from each signal layer to represent a waveform substantially identical with that of a signal which has been recorded.

In such case, the master disc for each of the signal layers may be prepared by varying the intensity of each pulse of the light pulse train to thereby change the pit width or pit length.

The present invention also provides a multilayer optical disc of a single-side reading type, one of the signal layers which is furthest from a substrate through which a playback beam is projected being formed with a reflective film, and the remaining signal layers being formed with a semitransparent film, wherein in consideration of a change in reproduced waveform of any one of the signal layers relative to the light pulse train, a pit width or pit length of each signal layer is adjusted so as to permit a signal reproduced from each signal layer to represent a waveform substantially identical with that of a signal which has been recorded. In particular, there is provided the multilayer optical disc wherein in consideration of a change in reproduced waveform of one of the signal layers relative to the light pulse train for the signal layer closest to the substrate, a pit width or pit length of each signal layer is adjusted so as to permit a signal reproduced from each signal layer to represent a waveform substantially identical with that of a signal which has been recorded According to the present invention, by using the above discussed master discs, the multilayer optical disc can be obtained from which information recorded on each of the signal recorded layers can be reproduced satisfactorily. In the case of the multilayer optical disc of the type formed by bonding the replicas having respective signal recorded layers having associated pit trains, the size of the pit may vary depending on the condition for formation of the semitransparent or reflective film overlaying the recesses or protrusions in each signal recorded layer. However, in the present invention, arrangement has been made so that the substantially same reproduced waveforms can be obtained for the substantially same recorded signals and, therefore, the signal recorded on each of the signal recorded layers can be satisfactorily reproduced.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which:

FIGS. 3A, 3B and 3C are schematic diagrams showing a waveform of an original signal and respective waveforms of recording beams used to record information on first and second signal recorded layers of the optical disc according to the present invention;

FIG. 4A-1 and FIG. 4B-1 represent respective waveforms reproduced from the disc C and FIG. 4A-2 and FIG. 4B-2 represent respective waveforms reproduced from the disc B, both discussed in connection with a second Example;

FIG. 10 is a diagram showing various reproduced waveforms shown in relation to the waveform of the original signal and the waveform of the exposure light pulse trains used in the second Example.

DETAILED DESCRIPTION OF THE EMBODIMENTS

A recording apparatus used to make a master disc in accordance with the present invention and a method of making a multilayer optical disc from the master disc will be described.

The recording apparatus used in the practice of the present invention includes a drive mechanism for rotating a glass substrate coated with a photosensitive material and also for moving a recording head for projecting a recording beam onto a desired position, and an optical system for preparing the recording beam, which has been modulated according to a signal to be recorded, and for projecting the recording beam.

The drive mechanism includes a rotary drive mechanism for rotating the glass substrate, a slide mechanism for moving the recording head to any desired radial position and a control system for controlling a combination of those movements.

The rotary drive mechanism includes a turntable for chucking the glass substrate and a spindle supported by pneumatic bearings for rotating the turntable.

The slide mechanism includes a hoverable, non-contact slider, a linear motor for driving the slider and a length measuring system for measuring the distance of movement.

The slider includes a fixed guide and a hoverable table that is movable at one axis along the fixed guide and is provided with a recording head for projecting the recording beam onto any desired radial position on the glass substrate.

The linear motor is secured to an undersurface of the slider and is operable to drive the table by coupling a movable portion with the table of the slider.

The length measuring system (comparator system) includes a laser interferometer (manufactured by Hewlett Packard) and is capable of detecting the movement of the table of the slider with 10 nm resolution.

The control system compositely drives the rotary drive mechanism and the slide mechanism to accomplish a CAV (Constant Angular Velocity) when the number of revolutions and the track pitch are specified and a CLV (Constant Linear Velocity) when the linear velocity and the track pitch are specified. In addition, the spindle can turn in any one of clockwise and counterclockwise directions and even the slide can be moved inwardly from an outer periphery of the glass substrate and outwardly from an inner periphery thereof at intervals of a specified pitch.

The control system referred to above has a function of selectively opening and closing a shutter for the recording beam and a voltage setting function for setting the intensity of light emerging from a recording beam intensity adjusting device and is capable of automatically executing a recording operation when parameters for the recording operation are inputted.

Figure 7:
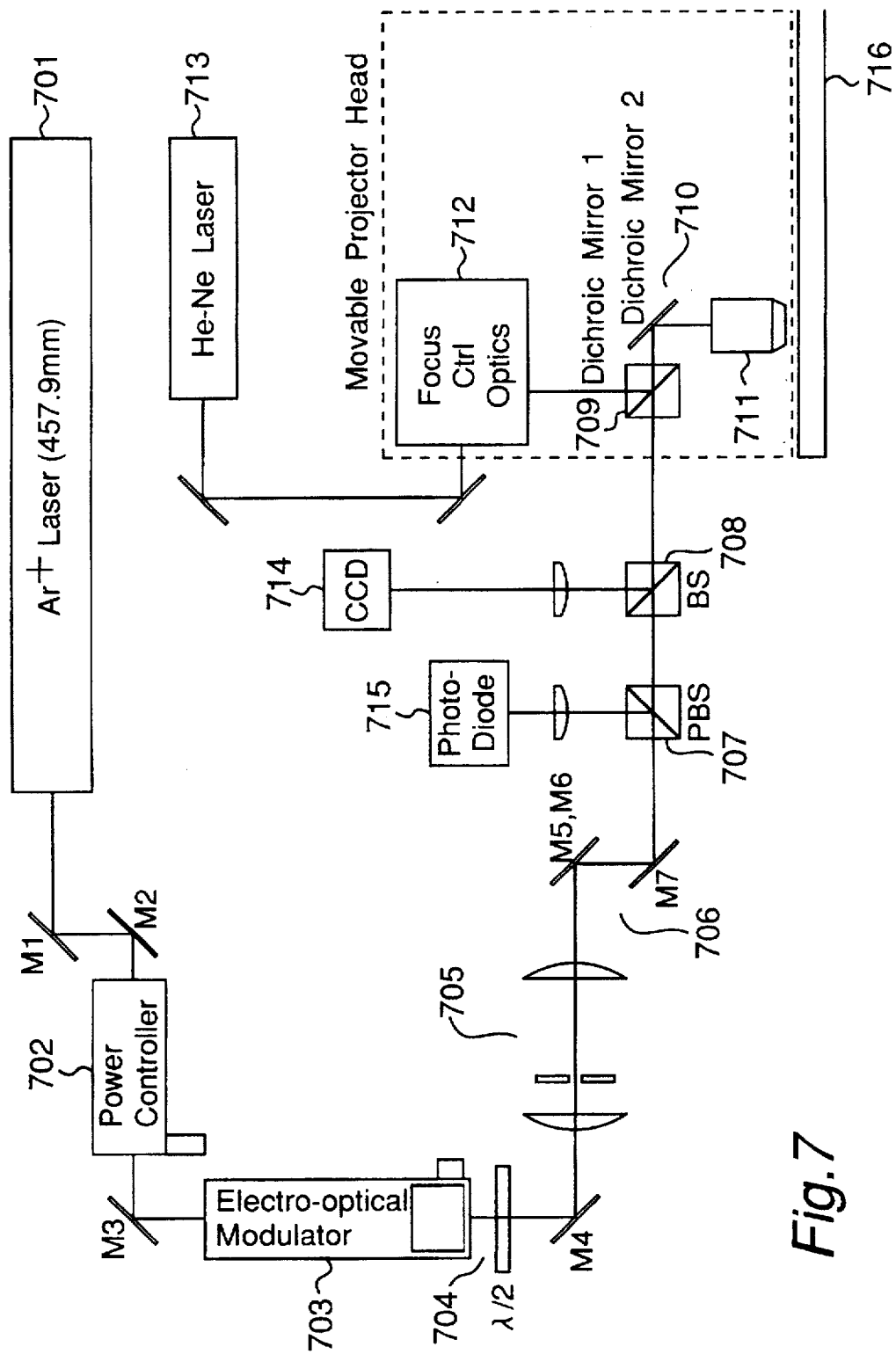
FIG. 7 is a schematic block diagram showing a recording device used to form the multilayer optical disc according to the present invention.
Figure 8:
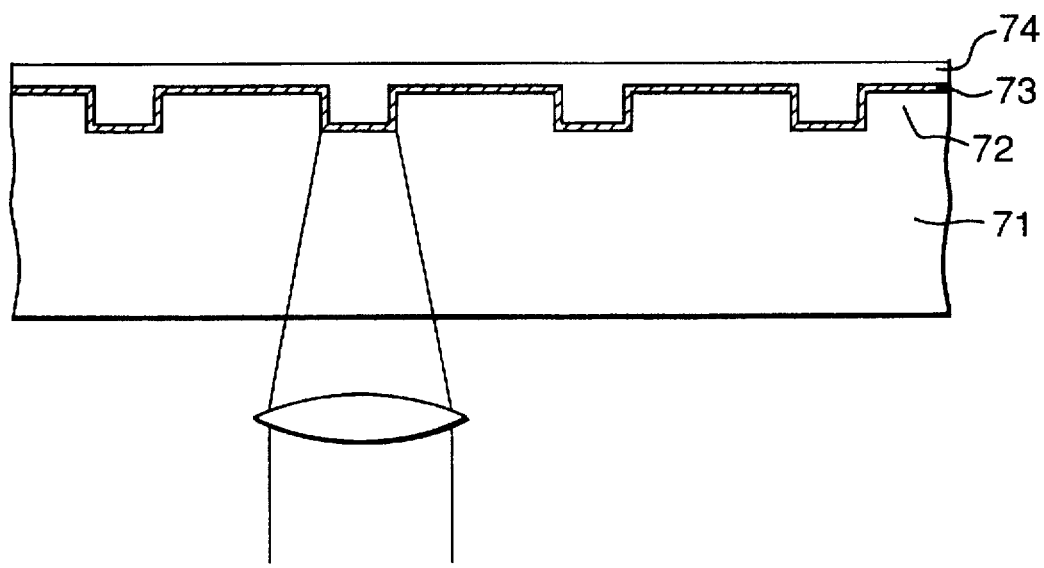
FIG. 8 is a schematic sectional representation showing the prior art optical disc.
Figure 9:
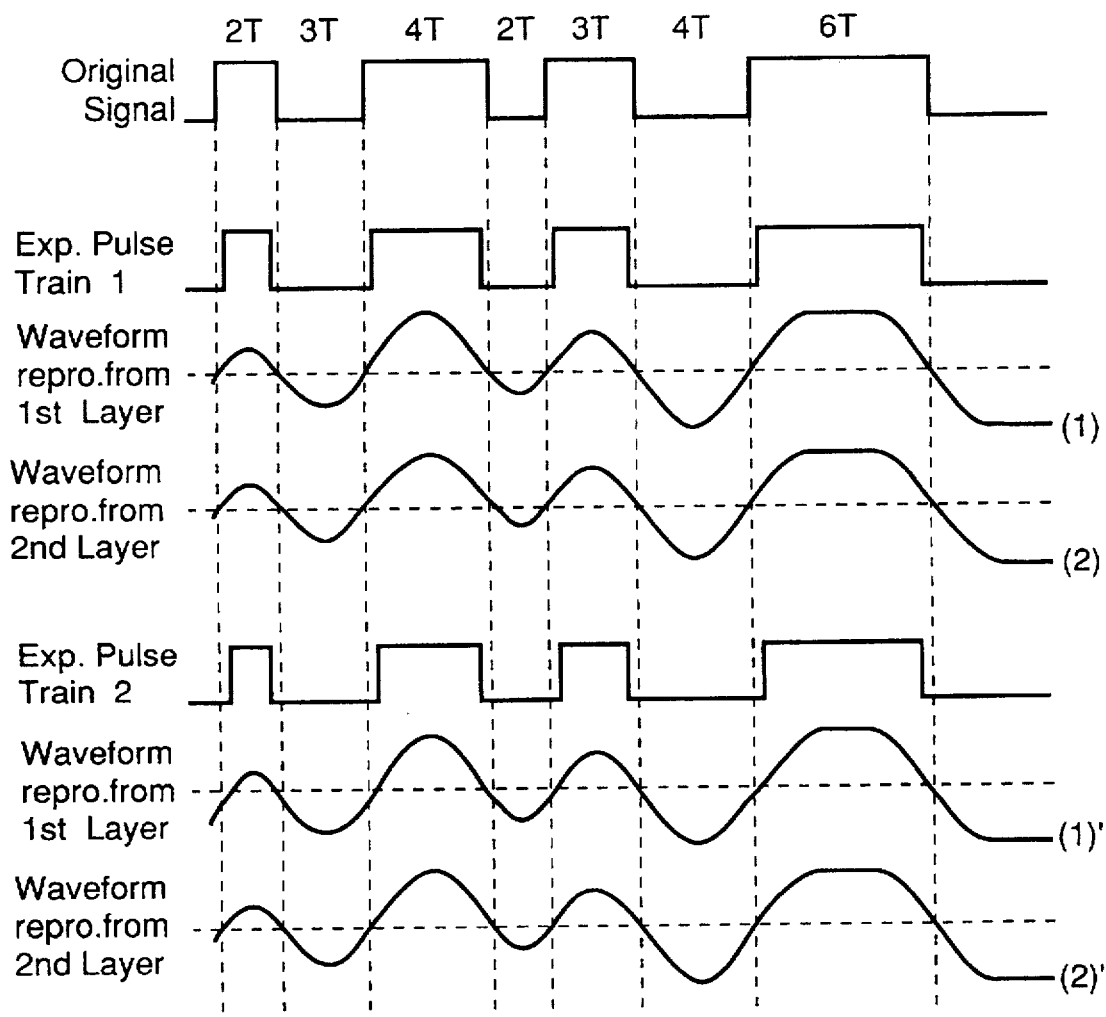
FIG. 9 is a diagram showing various reproduced waveforms shown in relation to the waveform of the original signal and the waveform of the exposure light pulse trains used in Example 1.

The optical system will now be described in detail with particular reference to FIG. 7. The optical system has a basic structure including a source of the recording beam, a beam intensity adjuster, a beam modulator, a beam enlarger, a recording beam intensity monitor, a movable projector head including a focus control system, a reflected beam monitor for monitoring a beam reflected from the glass substrate and a plurality of mirrors optically connecting them together.

The recording beam source is employed in the form of an argon ion laser 701 (Innova 307, manufactured by Coherent) and is radiated at a wavelength of 457.9 nm.

The beam intensity adjuster is employed in the form of a noise eater 702 (LASS-II, manufactured by Con Optics), an element utilizing an electrooptical effect, and is operable to remove a change in output unique to a gas laser and also to adjust the intensity of a transmitted light to a desired intensity. The noise eater 702 comprises a head in which crystal having an electro-optical effect is arranged, a polarizing beam splitter for separating light according to the direction of wavefront, a pick-off for reflecting a portion of the transmitted light, a detector utilizing a photodiode of a silicon type capable of measuring the intensity of the reflected light, a control box for controlling them and an electric power supply. By comparing a voltage inputted to the control box with an output voltage of the detector and adjusting the amount of rotation of the wavefront using a voltage to be applied to the element, the intensity of the light transmitted through the polarizing beam splitter can be changed and, by adjusting the respective voltages of the both to become equal to each other, any variation in output from the laser can be removed and, also, the intensity of light emitted therefrom can be adjusted.

For the beam modulator, a modulator 703 utilizing the electrooptical effect (50 MHz band, manufactured by Con Optics) is employed. This beam modulator includes a head in which crystal having an electro-optical effect is arranged, a polarizing beam splitter for separating light according to the direction of wavefront, a pick-off for reflecting a portion of the transmitted light, a detector for measuring the intensity of that portion of the transmitted light, a pick-off for reflecting a portion of light reflected by the polarizing beam splitter, a detector for measuring the intensity of that portion of the light reflected by the polarizing beam splitter, a power source driver for applying a voltage to the head and an ABC (Auto Bias Control) device for automatically adjusting a bias point thereof optimally. The modulator performs a switching on and off of the transmitted light when a voltage is applied to the head according to a digital signal having High and Low levels. In addition to a C-ABC device capable of adjusting the bias point so as to render the average value of the transmission intensities of the element to be uniform and a B-ABC device adapted to receive a blanking pulse indicative of the timing at which the input is rendered in a Low level in synchronism with a signal to be modulated and to adjust the bias point so as to render the detector output of the transmitted light or the reflected light during the duration of the pulse to be minimum, the ABC device has a function of adjusting the bias point by detecting the timing at which the modulated signal is rendered in a Low level and adjusting the bias point automatically so as to minimize the detector output obtained at that timing.

The beam expander 705 is employed in the form of a Kepler beam expander of a type including two plano-convex lenses and a pinhole and has a magnification adjusted to be about 80% of the objective transmissivity exhibited when no beam expander is employed. The pinhole disposed at a focal point of a lens on an incident side is operable to shape the wavefront of the beam.

For adjustment of the head incident optical axis, three mirrors 706 are disposed following the beam expander. For this reason, steering of dual-axis parallel movement and dual-axis tilting of the beam is possible and, accordingly, adjustment of the degree of parallelization relative to the movement of the slider as will be described later and the position of the light incident on an objective can be finely adjusted. It is to be noted that disturbance of the wavefront upon reflection by those mirrors would adversely affect the size of a spot when the light is converged and, therefore, those mirrors are preferably made by the use of a substrate of 30 mm or more in diameter and 5 mm or more in thickness.

For the purpose of monitoring the recording intensity during the recording, the design has been made that by adjusting the angle of rotation of the polarizing beam splitter (PBS) 707 disposed following the incidence adjusting mirror 706 and a half-wavelength plate 704 disposed immediately after the light modulator, a portion of the light is extracted and is in turn collected so that a photodetector 715 can detect the average intensity of the modulated light.

The movable projector head is structured in the form as attached to the table of the previously discussed table and includes a focus control optical system 712 utilizing light emitted from a He—Ne laser 713, a dichroic mirror 709 of a cube type operable to pass the recording beam of 457.9 nm therethrough, but reflect light of 632.8 nm therefrom for combining the He—Ne laser beam and the recording beam together, a mirror 710 capable of reflecting light of both wavelengths and an objective lens 711 fitted to an focus actuator.

While the He—Ne laser 713, which is the beam source, is positioned externally of the slider, the focus control optical system is operable to adjust the optical axis to render the latter parallel to the movement of a stage so as to guide the beam to the stage and employs a focus control technique which can cope with any one of a slant incidence method and an astigmatism method.

In order to confirm a condition of the recording beam converged at the glass substrate 716, a beam splitter 708 having about 10% reflectivity is disposed following the polarizing beam splitter 707 so that about 10% of the recording beam reflected by the glass substrate 716 can be reflected by the beam splitter 708 so as to travel towards a CCD camera 714. It is to be noted that on the optical path between the CCD camera 714 and the beam splitter 708, a lens element is employed to adjust the length of an optical path between the light receiving surface of the CCD camera 714 and the beam splitter 708 to be equal to the length of the optical path between the beam splitter 708 and a surface of the glass substrate 716 wherefore the shape of a beam spot monitored by the CCD camera 714 can provide an indication of the con-focal condition of the recording beam converged at the glass substrate 716.

Figure 5:
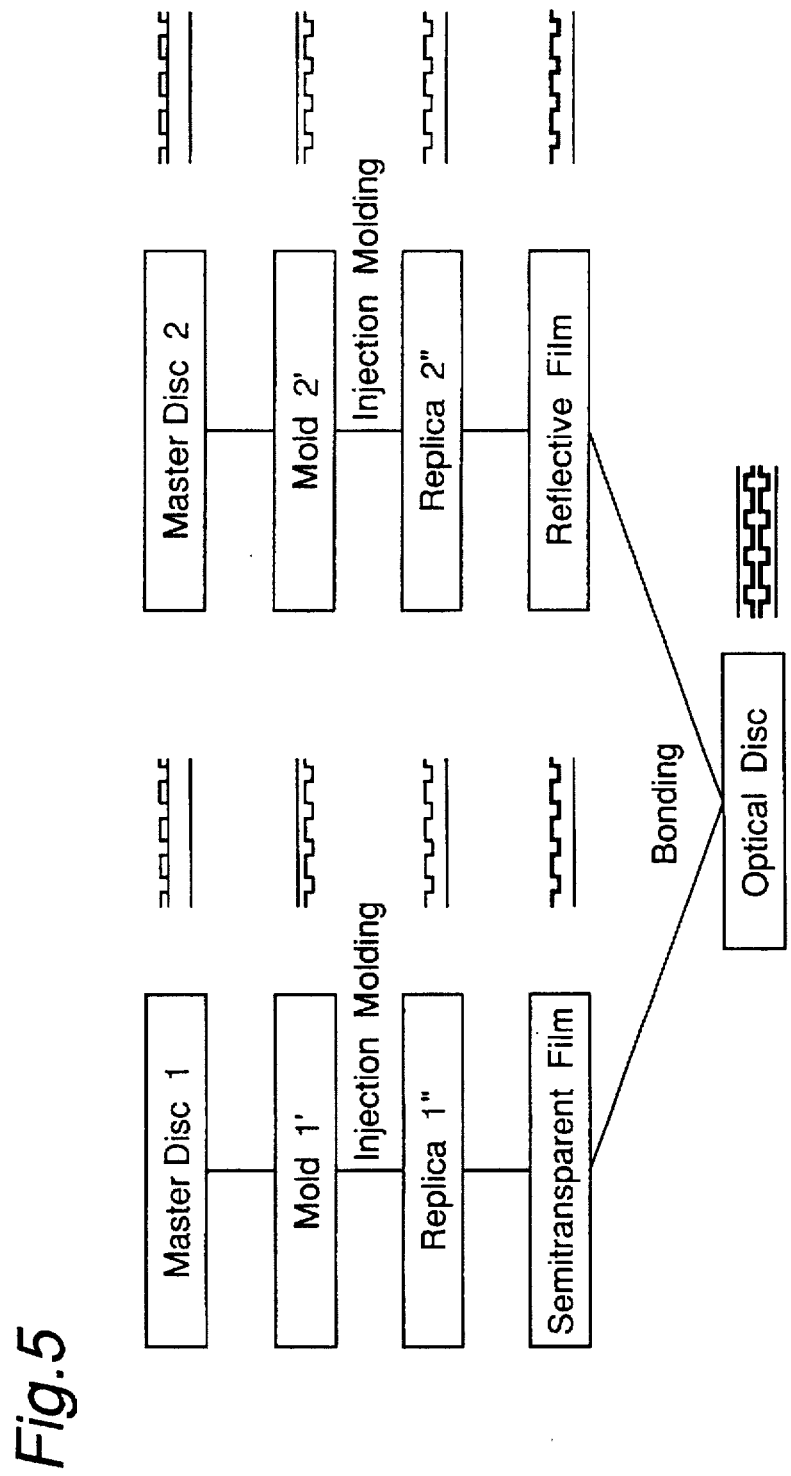
FIG. 5 is a schematic diagram showing a method of making a multilayer optical disc according to the present invention.

A process of making a dual-layer optical disc having two signal layers prepared by the use of two master discs fabricated by the recording device of the type discussed above will now be described with particular reference to FIG. 5.

In the first place, using the recording device of the type discussed hereinbefore, first and second master discs 1 and 2 for respective signal layers are prepared. It is to be noted that the first and second master discs 1 and 2 have respective spiral pit patterns formed thereon, the spiral pit pattern on the first master disc 1 being in an opposite sense to that on the second master disc 2.

Then, first and second metal molds or stampers 1' and 2' onto which the respective spiral pit patterns on the first and second master discs 1 and 2 have been transferred are prepared. Using any known injection molding technique, first and second replica discs 1" and 2", each 0.6 mm in thickness, having one surface formed with duplicated pit patterns are molded Thereafter, the first replica disc 1" has a pit-patterned surface formed with a semitransparent film of gold (Au) by the use of any known sputtering technique while the second replica disc 2" has a pit-patterned surface formed with a reflective film of aluminum (Al) by the use of any known sputtering technique.

The first and second replica discs 1" and 2" are then bonded together with the pit-bearing surface of the first replica disc 1" facing the pit-bearing surface of the second replica disc 2", by the use of a transparent acrylic bonding material that can be cured by irradiation of ultraviolet rays of light. The resultant optical disc is of a structure including a first signal layer represented by the first replica disc 1" and a second signal layer represented by the second replica disc 2", information being readable from each of the first and second signal layers.

The details of the dual-layer optical disc so manufactured in the manner described above are best shown in FIG. 6. As shown therein, the optical disc includes a front transparent substrate 61, a first signal layer 62 formed in the front transparent substrate 61, a semitransparent film 63 deposited on the first signal layer 62, a rear transparent substrate 67, a second signal layer 66 formed in the rear transparent substrate 67, a reflective film 65 deposited on the second signal layer 66, a transparent bonding layer 64 used to bond the front and rear substrates 61 and 67 together and intervening between the semitransparent film 63 and the reflective film 65. Reading of information from each of the first and second signal layers is carried out from the side of the front transparent substrate 61. Even with the optical disc of the above discussed structure, when viewed from the side of the transparent substrate 61, the first and second layers 62 and 66 have recesses and protrusions reversed relative to each other.

Specific examples of the multilayer optical disc and the method of making the same in accordance with the present invention will now be demonstrated

EXAMPLE 1

Figure 1A:
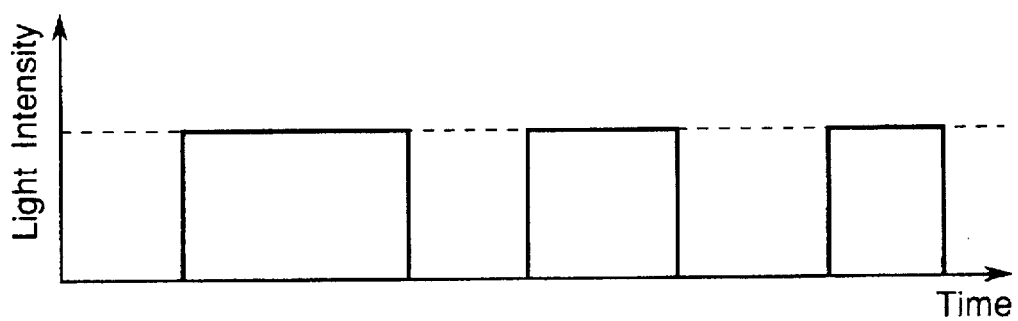
FIGS. 1A and 1B are explanatory diagrams used to explain a method of correcting a light pulse train used in making a master disc used in a first Example.
Figure 1B:
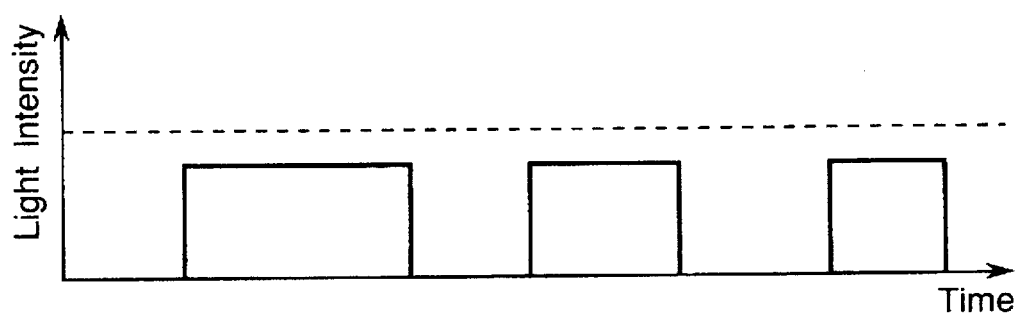

Using the first and second master discs having respective pit patterns of different widths and lengths which were accomplished by reducing the intensity of the recording beam (a pulse train shown in FIG. 1A) for recording information on the second layer to a value equal to 94% of that of the recording beam (a pulse train shown in FIG. 1B) for recording information on the first layer and varying the respective intensities of the recording beams, a multilayer optical disc A having first and second signal layers was prepared. Change in intensity of each of the recording beams was carried out by changing the input voltage to the beam intensity adjuster.

The signal recorded was a random digital signal of a length ranging from twice (2T) to nine times (9T) of a reference time TW=150 ns and was recorded at a linear velocity of 1.5 m/s in a spiral pattern of 0.79 µm in track pitch to form a spiral train of pits of 0.45 µm in minimum pit length with the neighboring tracks spaced at a pitch of 0.79 µm.

Using the process similar to that used to form the optical disc A and using the first and second master discs both formed by the use of the recording beams of the same intensity, a multilayer optical disc B was prepared and a signal recorded on the optical disc B was reproduced by the use of a playback optical system which used a wavelength of 680 nm and an aperture number of 0.6. The waveform of the signal so reproduced is shown in FIG. 2. (This form is generally referred to as an eye pattern.)

Figures 1, 2A:
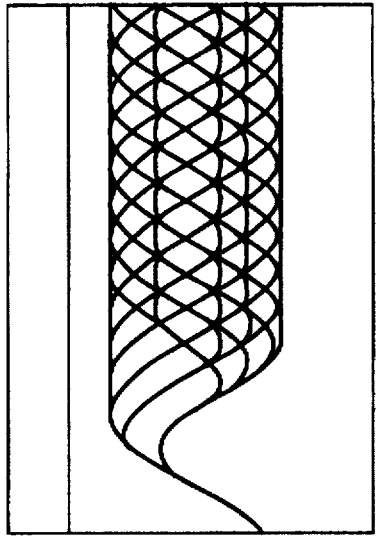
FIG. 2A-1 and FIG. 2B-1 represent respective waveforms reproduced from the disc A and FIG. 2A-2 and FIG. 2B-2 represent respective waveforms reproduced from the disc B, both discussed in connection with the first Example.
Figures 2, 2A:
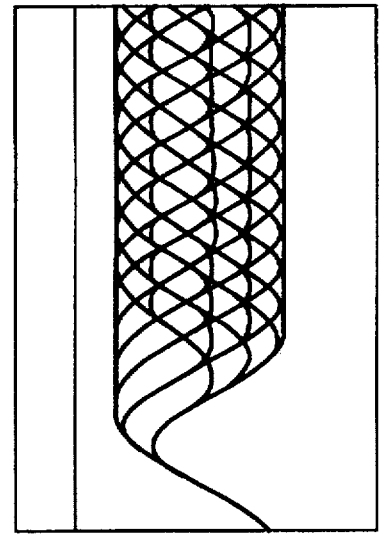
Figures 1, 2B:
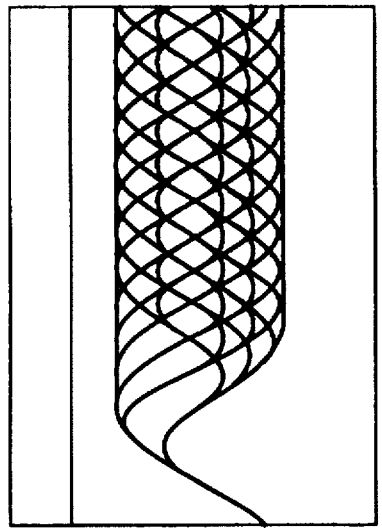
Figures 2, 2B:
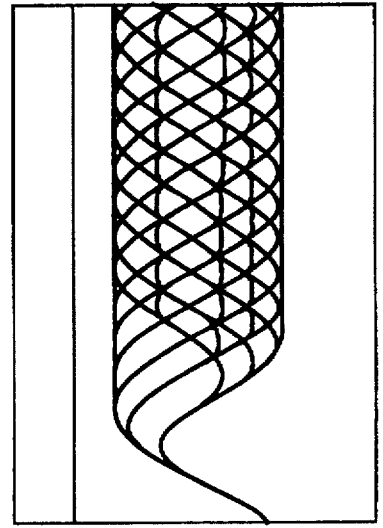
Figures 1, 4A:
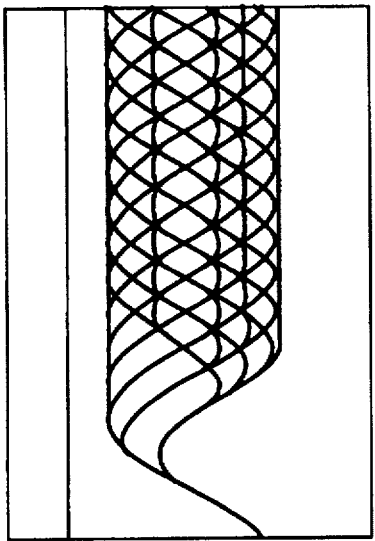
Figures 2, 4A:
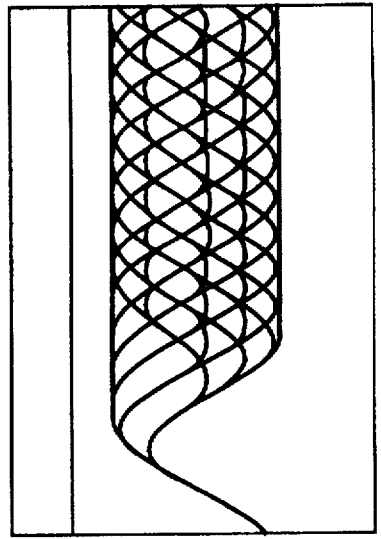
Figures 1, 4B:
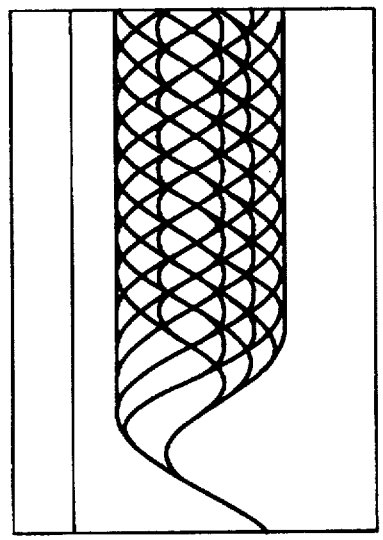
Figures 2, 4B:
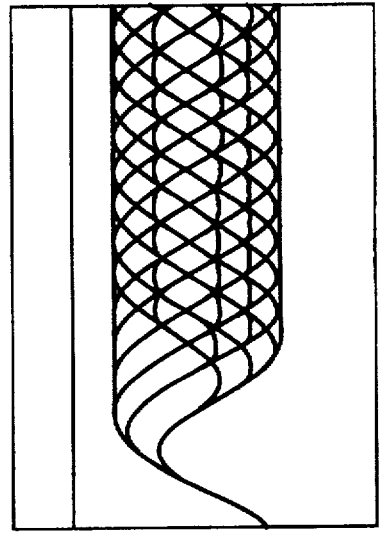

FIG. 2A-1 and FIG. 2B-1 represent respective waveforms reproduced from the disc A and FIG. 2A-2 and FIG. 2B-2 represent respective waveforms reproduced from the disc B. In particular, FIGS. 2A-1 and 2A-2 represent the respective reproduced waveforms of the signals recorded on the first layer whereas FIGS. 2B-1 and 2B-2 represent the respective reproduced waveforms of the signals recorded on the second layer.

It will be readily seen that in the disc B the position of a portion of the waveform which corresponds to the minimum pit length in the second layer (as shown in FIG. 2A-2) is higher than that in the second layer (as shown in FIG. 2B-2). In contrast thereto, in the disc A, the respective reproduced waveforms of the first and second layers remained substantially identical with each other.

Figure 6:
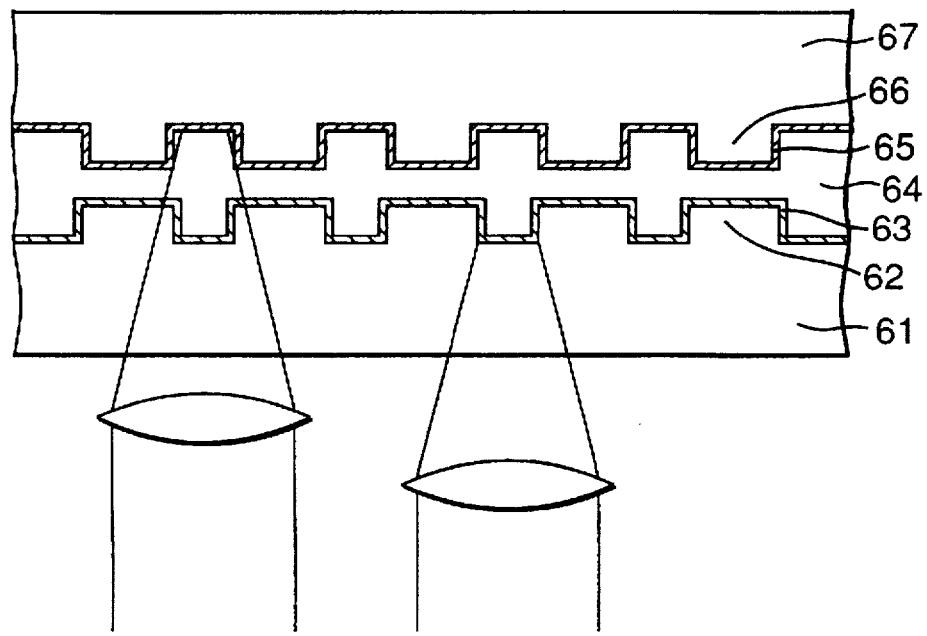
FIG. 6 is a schematic sectional representation of a dual-layer optical disc manufactured according to the present invention.

The dual-layer optical disc manufactured according to Example 1 is of a structure wherein as shown in FIG. 6, recesses and protrusions representing the pit pattern in the first layer are substantially reverse to those in the second layer, and the recesses and protrusions in the second layer are formed in the aluminum reflective film so that light reflected therefrom can be picked up through the first layer. For this reason, since the shape of the pit patterns varies depending on the condition in which the aluminum reflective film is formed in the second layer, the substantial size of the pits varies.

FIGS. 2A-2 and 2B-2 speak of the fact that, under the conditions employed to manufacture the dual-layer optical disc according to Example, 1, the pits in the second layer have a size substantially larger than those in the first layer.

For this reason, in the preparation of the optical disc A, the intensity of the recording beam used during the preparation of the master disc for the second layer was reduced so that the pits smaller in size than those in the first layer could be formed, thereby rendering the waveform of the signal reproduced from the second layer to be substantially identical with that in the first layer as shown in FIGS. 2A-1 and 2B-1.

The foregoing function and effect can readily be understood when the reproduced signals are compared with the original signals.

Specifically, assuming that the original signal consists of a sequence of a 2T pit, a 3T space, a 4T pit, a 2T space, a 3T pit, a 4T space and a 6T pit, and when the first and second signal layers are formed by the use of an exposure light pulse train 1 while the exposure light pulse train 1 and the exposure light pulse train 2 are chosen to be of the above described ratio (1:0.94) relative to the original signal, the waveform reproduced from the first layer shown by (1) does not match with that from the second layer shown by (2). Similarly, even if the first and second signal layers are formed by the use of the exposure light pulse train 2, the waveform reproduced from the first layer shown by (1)' does not match with that from the second layer shown by (2)'. However, comparing the reproduced signals (1), (2), (1)' and (2)' with each other, it will readily be seen that the waveforms (1) and (2)' substantially match with each other.

Results of measurement of jitters which occurred in the reproduced waveforms are shown in Table 1. The jitter represents the deviation between the signal length of a reproduced signal and the standard signal length and is represented by the quotient of the standard deviation C thereof divided by TW, that is, $\sigma/TW$.

TABLE 1

| | Jitter ($\sigma/TW$) (%) | |
| --- | --- | --- |
| | First Layer | Second Layer |
| Disc A | 6.3 | 7.3 |
| Disc B | 6.3 | 9.0 |

From Table 1, it is clear that when the recording method according to the present invention is employed, the jitter occurring during the information playback is improved, accompanied by increase in quality of the reproduced signal. It is also clear that as compared with the optical disc B the optical disc A may be said to be an excellent optical disc since information can be read from any one of the signal layers with no substantial distortion.

It is to be noted that although in Example 1 discussed above, the intensity of the recording beam for recording information on the master disc for the second layer has been described as reduced relative to that of the recording beam for recording information on the master disc for the first layer, the intensity of the recording beam for recording information on the master disc for the second layer may be increased as compared with that of the recording beam for recording information on the master disc for the second layer provided that, depending on the conditions for manufacture of the optical disc and characteristics of the playback optical system the position of that portion of the waveforms reproduced from the second layer which corresponds to the minimum pit is lower than that from the first layer.

EXAMPLE 2

A pulse generator circuit for generating the exposure light pulse was added with a circuit for adjusting the length of the starting and terminating ends of each exposure light pulse equally in units of 5 ns so that as shown in FIG. 3, the start and termination of each pulse of the exposure light pulse train used during recording of the master disc for the second layer could be delayed and advanced, respectively, as compared with those during recording of the master disc for the first layer to thereby reduce the duration of the pulses actually projected (When the duration of each pulse of the recording beam for the first signal layer is shortened by 50 ns (or 75 nm in terms of that on the disc), the duration of each pulse of the recording beam for the second signal layer is shortened by 80 ns (or 120 nm in terms of that on the disc).). Using those master discs so prepared, a multilayer optical disc C having the first and second signal layers having respective pits of different sizes was manufactured.

The specific process of making the disc was substantially similar to that discussed with reference to FIG. 5.

Respective waveforms of signals on the optical disc C and the optical disc B discussed previously which were reproduced using the same playback optical system as used in Example 2 are shown in FIG. 4. The signal recorded on the optical disc C was identical with that on the optical disc B. FIG. 4A-1 and FIG. 4B-1 represent respective waveforms reproduced from the disc C and FIG. 4A-2 and FIG. 4B-2 represent respective waveforms reproduced from the disc B. In particular, FIGS. 4A-1 and 4A-2 represent the respective reproduced waveforms of the signals recorded on the first layer whereas FIGS. 4B-1 and 4B-2 represent the respective reproduced waveforms of the signals recorded on the second layer.

It will readily be seen that in the optical disc C the waveforms of the signal reproduced from the first signal layer are substantially identical with those from the second signal layer. This was accomplished by reducing the duration of each pulse of the exposure light pulse train to thereby reduce the size of the substantial pits in the second layer in a manner similar to that discussed in connection with Example 1.

The foregoing function and effect can readily be understood when the reproduced signals are compared with the original signals.

Specifically, assuming that the original signal consists of a sequence of a 2T pit, a 3T space, a 4T pit, a 2T space, a 3T pit, a 4T space and a 6T pit as shown in FIG. 10, and when the first and second exposure light pulse trains 1 and 2 which were shortened by the respective quantities (50 ns and 80 ns) relative to the original signal as shown in FIG. 3 were used to form the first and second signal layers, respectively, and when the first and second signal layers were formed by the use of the exposure light pulse train 1, the waveform reproduced from the first layer shown by (1) does not match with that from the second layer shown by (2). Similarly, even if the first and second signal layers are formed by the use of the exposure light pulse train 2, the waveform reproduced from the first layer shown by (1)' does not match with that from the second layer shown by (2)'. However, comparing the reproduced signals (1), (2), (1)' and (2)' with each other, it will readily be seen that the waveforms (1) and (2)' substantially match with each other.

Results of measurement of jitters which occurred in the reproduced waveforms are shown in Table 2.

TABLE 2

| | Jitter (σ/TW) (%) | |
| --- | --- | --- |
| | First layer | Second Layer |
| Disc A | 6.3 | 7.3 |
| Disc B | 6.3 | 9.0 |

From Table 2, it is clear that when the recording method according to the present invention is employed, the jitter occurring during the information playback is improved, accompanied by increase in quality of the reproduced signal. It is also clear that as compared with the optical disc B the optical disc C may be said to be an excellent optical disc since information can be read from any one of the signal layers with no substantial distortion.

It is to be noted that although in Example 2 discussed above, the duration of each pulse of the exposure light pulse train for recording information on the master disc for the second layer has been described as reduced relative to that of the recording beam for recording information on the master disc for the first layer, the duration of each pulse of the recording beam for recording information on the master disc for the second layer may be increased as compared with that of the recording beam for recording information on the master disc for the second layer provided that, depending on the conditions for manufacture of the optical disc and characteristics of the playback optical system the position of that portion of the waveforms reproduced from the second layer which corresponds to the minimum pit is lower than that from the first layer.

Although the present invention has been described in connection with the preferred embodiments thereof with reference to the accompanying drawings, it is to be noted that various changes and modifications are apparent to those skilled in the art. By way of example, the method of making the multilayer optical disc according to the present invention can be equally applied to any other dual-layer optical disc of a structure different from that discussed in connection with the preferred embodiment of the present invention and/or of a type manufactured by any other method than the method of the present invention, or to a multilayer optical disc of a structure having many signal recorded layers each neighboring layers being spaced a certain thickness from each other so as to provide a substantial thickness of the substrate that is variable during playback of information from each layer.

Accordingly, such changes and modifications are to be understood as included within the scope of the present invention as defined by the appended claims, unless they depart therefrom.

What is claimed is:

1. A method of making a multilayer optical disc having a plurality of signal layers from which information can be read by irradiating any one of the layers with a playback light, which is reflected from a surface of the multilayer optical disc, and reading waveforms reproduced by the reflected light, the method comprising:

forming a pit pattern, corresponding to a signal layer, on a first master disc, said pit pattern being formed by exposing said first master disc to an exposure light pulse train which is modulated in accordance with a signal to be recorded;

forming a pit pattern, corresponding to a signal layer, on a second master disc, said pit pattern being formed by exposing said second master disc to an exposure light pulse train which is modulated in accordance with the signal to be recorded;

transferring said pit pattern formed on said first master disc to a first mold such that said first mold has a pit pattern which is a replica of the pit pattern formed on said first master disc;

transferring said second pit pattern formed on said second master disc to a second mold such that said second mold has a pit pattern which is a replica of the pit pattern formed on said second master disc;

preparing a replica disc from said first mold;

preparing a replica disc from said second mold; and bonding said replica disc from said first mold to said replica disc from said second mold in a face-to face manner in order to form an optical disc having a plurality of signal layers, wherein each of said pit patterns formed on said first and second master discs has a pit width or a pit length which is chosen so as to permit a signal reproduced from each of said first and second signal layers to represent a waveform which is substantially identical with that of the recorded signal.

2. The method of making a multilayered optical disc as claimed in claim 1, wherein during forming of said pit patterns on said first and second master discs, a starting or terminating end of each pulse of the light pulse train is advanced or delayed during exposure to the light pulse train in consideration of a change in reproduced waveform from any one of the signal layers relative to the light pulse train to thereby change the pit width or pit length so as to provide a signal reproduced from each signal layer which represents a waveform that is substantially identical with that of the recorded signal.

3. The method of making a multilayered optical disc as claimed in claim 2, wherein said pit patterns are formed on said first and second master discs by advancing or delaying the starting or terminating end of each pulse of the light pulse train by an equal amount.

4. The method of making a multilayered optical disc as claimed in claim 1, wherein during forming of the pit patterns on said first and second master discs, an intensity of each light pulse of the light pulse train is varied in consideration of a change in reproduced waveform of any one of the signal layers relative to the light pulse train to thereby change the pit width or pit length so as to permit a signal reproduced from each signal layer to represent a waveform substantially identical with that of the recorded signal.

5. The method of making a multilayered optical disc as claimed in claim 4, wherein the intensity of each pulse used during forming of said pit pattern on said second master disc is reduced in order to form pits which are smaller in pit width or pit length than those formed on said first master disc.

6. A single-side reading multilayer optical disc comprising:

a plurality of signal layers, corresponding to a light pulse train modulated according to a signal to be recorded, formed in a plurality of substrates, respectively, wherein each signal layer of said plurality of signal layers has a pit pattern of recesses and protrusions;

a reflective film formed on one of said plurality of signal layers which is located furthest from a read side of said optical disc; and a semitransparent film formed the other of said plurality of signal layers, wherein, in order to avoid a change in a waveform reproduced from any one of the plurality of signal layers relative to said light pulse train, a pit width or pit length of said pit pattern of each of said signal layers is configured so that each signal layer constitutes means for providing a reproduced signal which represents a waveform that is substantially identical with that of the recorded signal.

7. The single-side reading multilayer optical disc as claimed in claim 6, wherein the pit width or pit length of one of said plurality of signal layers is different relative to the pit width or pit length of the one of said plurality of signal layers which is located closest to the read side of said optical disc such that a signal reproduced from each signal layer represents a wave form which is substantially identical with that of the recorded signal.

8. A multilayer optical disc comprising:

a front transparent substrate;

a first signal layer formed in said front transparent substrate and having a pit pattern of recesses and protrusions which correspond to a recorded signal;

a semitransparent film deposited on said first signal layer;

a rear transparent substrate;

a second signal layer formed in said rear transparent substrate and having a pit pattern of recesses and protrusions which correspond to the recorded signal, wherein said pit pattern of said second signal layer has a pit width or length which is different relative to a pit width or length of said pit pattern of said first signal layer so as to provide a reproduced waveform from said first signal layer and said second signal layer which is substantially identical with that of the recorded signal;

a reflective film deposited on said second signal layer and opposing said semitransparent film; and a transparent bonding layer disposed between said semitransparent film and said reflective film so as to bond together said front and rear transparent substrates, wherein reading of each of said first and second signal layers is from said first transparent substrate side of said multilayer disc.

9. The multilayer disc as claimed in claim 8, wherein the pits of said second signal layer are smaller in size relative to the corresponding pits of said first signal layer.

10. The multilayer disc as claimed in claim 8, wherein said reflective film comprises an aluminum film and said semitransparent film comprises a gold film.

* * * * *